Jan. 7, 1947. A. M. DINKFELD ET AL 2,413,958
MOLDED MAGNESIA INSULATION AND METHOD OF MANUFACTURE
Filed Sept. 10, 1945
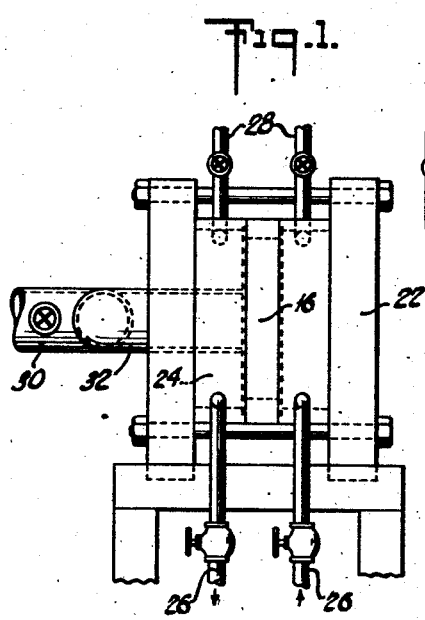
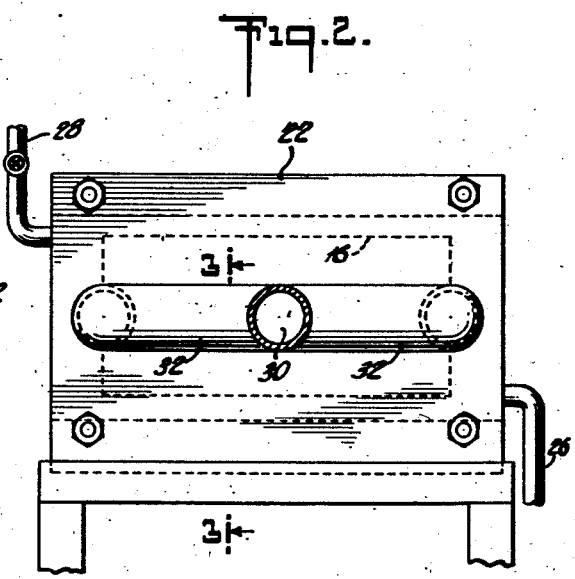
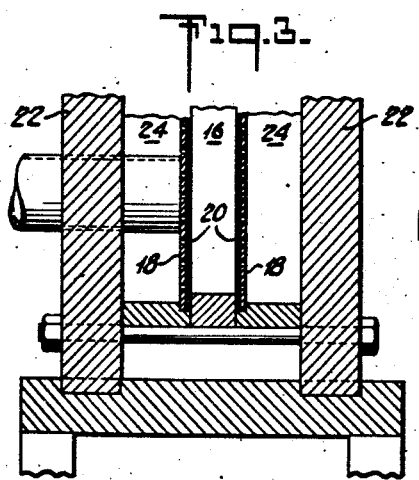
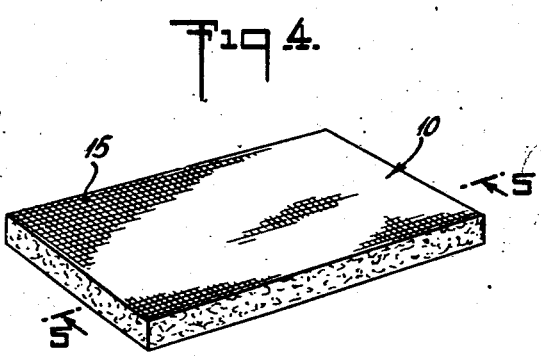
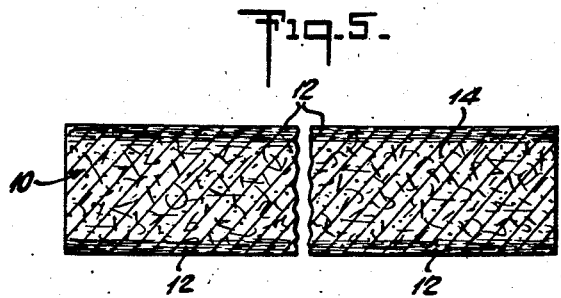
INVENTORS
HERMANN F. VIEWEG
AUGUST M. DINKFELD
BY Virgil C. Kline
ATTORNEY Patented Jan. 7, 1947

2,413,958

UNITED STATES PATENT OFFICE 2,413,958

MOLDED MAGNESIA INSULATION AND METHOD OF MANUFACTURE

August M. Dinkfeld, La Crescenta, Calif., and Hermann F. Vieweg, Highland Park, N. J., assignors to Johns-Manville Corporation, New York, N. Y., a corporation of New York Application September 10, 1945, Serial No. 615,278

12 Claims. (Cl. 92—54)

This invention relates to magnesia heat insulation, and is particularly directed to improved magnesia insulation blocks having comparatively high strength and low density characteristics, and to the method of making the same.

This invention was originally described in our copending application for Molded magnesia insulation and method of manufacture, Serial No. 456,618, filed August 29, 1942, of which the present application is a continuation-in-part.

Most of the magnesia insulation which is manufactured at the present time is of the so-called "85% magnesia" type, containing approximately 85 parts by weight of the basic carbonate and 15 parts of asbestos. The conventional process for making this product comprises carbonation of magnesia in aqueous suspension to produce a 1-2.5% bicarbonate solution from which the basic carbonate is precipitated by heating. A slurry of the basic carbonate and asbestos fibers is introduced to a filtering mold under a pressure of 30-75 lbs. per square inch, thereby forming a molded article or block, and dewatering the slurry. The block thus produced is then removed from the mold and subjected to a drying operation, yielding a block which is comparatively dense and strong.

To produce magnesia insulation blocks of comparatively low density, it has been heretofore considered necessary to mold a mixture of asbestos fibers, water and normal self-setting magnesium carbonate in open top non-filtering molds under substantially atmospheric pressure. The thus-molded block is then at least partially converted to the basic carbonate before removal from the mold to impart the necessary wet strength or preliminary set. Blocks thus produced may have a comparatively low density, but the physical strength of the lower density blocks is comparatively poor, with a low modulus of rupture.

A primary object of the present invention is to provide an improved magnesia insulation block having a comparatively low density and a comparatively high ratio of strength to density, even in the low density range.

Another object of the invention is to provide an improved method for molding and curing self-setting magnesia to form blocks of low density-high strength characteristics.

According to the present invention, magnesia insulation blocks of low density-high strength characteristics are produced by partially dewatering and shaping under pressure to final block dimensions the solids content of a dilute aqueous slurry comprising normal magnesium carbonate and asbestos fibers. A shape retaining set is imparted to the thus shaped wet solids block while supporting the same, by directly contacting an aqueous heating fluid, preferably hot water, with the surfaces of the block. The block is removed from contact with the aqueous heating fluid and finally cured by subjecting it to a drying treatment.

With the above objects and features in view, the invention consists in the improved product and method hereinafter described and more particularly defined by the appended claims.

In the following description, reference will be made to the accompanying drawing in which:

Fig. 1 is a view in side elevation of an appparatus suitable for molding and curing low density magnesia blocks in accordance with the present invention;

Fig. 2 is a view in front elevation of the apparatus of Fig. 1;

Fig. 3 is an enlarged vertical section of the lower part of the filter mold shown in Fig. 1, taken on plane 3—3 of Fig. 2;

Fig. 4 is a perspective view of a low density magnesia block in accordance with the present invention, showing the print of the mold filter on its exposed side surface; and Fig. 5 is a cross-sectional view of one of the blocks illustrating the differences in fiber orientation and density between the outer shell and the core.

According to a preferred embodiment of the invention which is practiced in the apparatus illustrated, the magnesia block 10 which forms the subject of the present invention is molded under low pressure in a filter mold and is given a partial heat curing treatment before removal from the mold. The resulting molded block does not shrink in volume during curing, and its structure includes a shell 12 of somewhat greater density than the core 14 and a distinctly different fiber orientation as between the core and the shell adjacent the plane surfaces of the block. Major areas of the hard surfaces of the block bear imprints 15 of the mold lining. By this particular method of molding in a filter press under low pressure in combination with careful curing within the mold, a block is produced having comparatively low dry density in the range 7.5-12 lbs. per cubic foot, and at the same time having a high strength or modulus as compared to the strength of a block not so molded and cured. In other words, the completely cured block of the present invention has a higher ratio of modulus to density than magnesia blocks of comparable density heretofore made, such ratio being at least 4.5 or above, with a modulus of rupture above 35 lbs. per square inch. The modulus of rupture can be determined by following standard methods for testing preformed block type thermal insulating materials, for example Specification C-165-41T of the American Society for Testing Materials.

The following specific illustration of the method and product of the present invention is given by way of example, and relates particularly to the method of molding magnesia blocks of generally rectangular shape. It will be understood that the invention has general application to the molding and curing of any desired structural shape, and that, whereas asbestos is employed in the specific example as the reinforcing fiber, other reinforcing fibers and fillers may be used.

In preparing a slurry of below castable consistency, a dilute aqueous suspension of finely divided, hydrated magnesia may be carbonated under conditions to produce normal magnesium carbonate ($MgCO_3$—$3H_2O$) directly, or else a solution of magnesium bicarbonate may be heated under conditions to produce the normal carbonate. Asbestos fibers in a minor proportion which is conventional for magnesia insulation may be added to the hydrated magnesia or bicarbonate before the treatment converting to normal carbonate, or the asbestos may be added after formation of the normal carbonate slurry. The slurry thus formed may then be dewatered or adjusted to a suitable consistency. In preparing the slurry, the treatment should be such as to convert at least a substantial proportion of the magnesia content to normal or hydrated self-setting magnesium carbonate.

Following the step of adjusting the consistency of the slurry to a suitable concentration, which may be 1½–5% by weight of solids, the slurry is introduced under low pressure into a pressure filter mold 16 having perforated walls 18 dimensioned to produce a block of the desired shape. A suitable mold of say 36" x 6" x 2" size should have at least two sides 18 representing a major proportion of its wall area (for example about 70%) perforated and preferably provided with canvas or other fine mesh textile or wire screen filter covering or lining 20, whereby to make it possible to rapidly dewater the mold charge without substantial loss of slurry solids under the relatively low pressure at which the charging operation is carried out. The mold 16 may be mounted in a filter press frame 22 with each perforated side wall 18 either forming, or abutting on, a perforated side of a drainage and heating jacket 24. The jackets thus located in the frame on each side of the mold are provided with valved water outlets 26 for removal of excess water, and with valved steam or hot water inlet pipes 28. Hydrostatic or pump pressure is maintained on the slurry during the period of charging the mold and of dewatering the charge within the mold. The pressure thus employed during the molding operation is one of the important factors of the present invention and is limited within the range 5–18 lbs. gauge, and preferably within the more limited range of 7–12 lbs. gauge, in order to produce a product of suitable low density and high strength characteristics.

After the mold has been completely charged with a self-setting normal magnesium carbonate-asbestos mixture, a valve in the slurry feed pipe 30 is closed, and a partial cure is effected by application of a controlled degree of heat to the charge within the mold. During the curing operation steam or hot water, at a suitable curing temperature and under pressure not exceeding about 5 lbs. gauge, is introduced into contact with all sides of the mold, or at least into contact with that portion of the mold wall area which is perforated. The steam or water thus supplied functions as a source of curing heat and also as the fluid heat conveying medium for transferring the heat into and through the mold charge of self-setting magnesium carbonate. In this way the necessary amount of shape retaining set is imparted at least to the outer shell of the molded article or block under cure within a comparatively brief period of 5–20 minutes. The molded article or block is then removed from the mold and subsequent completion of the setting operation is effected in the usual air drying oven at a temperature within the range of 170° F. to 300° F.

By keeping the curing temperature of the block low, i. e., within the range 175–190° F., a block of greater strength for a given low density is obtained at the expense of a somewhat longer curing period. When steam is used as the source of heat for effecting a partial cure, it should be maintained at a pressure not substantially above 5 lbs. gauge within the jacket or jackets 24 in contact with the mold, so as to avoid overcuring the surface of the block before effecting a preliminary cure of the block core. By substituting hot water for steam, it is possible to supply the necessary curing heat to the mold charge without much danger of developing a skin effect or overcure of the outside surface of the block. A block cured with water has been found under some conditions to offer less difficulty in removal from the mold after partial curing because of less tendency to stick to the mold wall.

As a means of reducing the time required to complete the necessary degree of preliminary curing within the mold, one feature of the present invention is that of heating the slurry so as to impart a pre-heat to the mold charge in the range of 130–150° F. The necessary degree of preliminary set can be rapidly developed by any means of heating the mold charge throughout to a temperature in the neighborhood of 170° F. In using steam or air under pressure as the source of heat, care must be used to avoid developing an undesirable skin effect on the molded block. This skin effect is apparently produced by overcuring the surface of the magnesia block, which lies immediately adjacent the perforated mold wall surface, thereby producing an outer surface layer which is not strongly bonded to the interior core of the block.

When the dimensions of the mold are such that the length to thickness ratio is comparatively high (as, for example, in a mold for a block of 18 inch length, 8 inch width, and 1 inch thickness), there is considerable advantage in introducing the slurry fed to the mold at both ends (as by branches 32 of feed pipe 30), or throughout the entire length of one side edge. This method of feeding yields a product of more uniform structure, apparently as the result of more uniform dewatering of the mold charge throughout its entire length. As previously indicated, the concentration of solids in the slurry charged to the mold should be low, preferably within the range 1½–5% solids. This low slurry concentration insures more effective dewatering of the mold charge and permits selective fiber orientation within the charge structure during the molding period.

One of the most important characteristics of the low density blocks, which are made in accordance with the low pressure filtering-molding operation of the present invention, is that in such blocks there is an observable increase in density of the outside surface or shell 12 as compared to the inside core; and there is also a marked orientation of the asbestos fibers in such shell, so that the fibers in the shell lie parallel to the block face and at right angles to the direction at which water is passed through the perforated mold walls during the molding operation. On the other hand, the fiber arrangement in the core of the mold is more or less heterogeneous. The formation of this hard and more strongly reinforced shell during the molding and preliminary curing operation within the mold is of great advantage in hastening completion of the molding and preliminary curing operation, and is believed to contribute markedly also to the production of a magnesia block which has a hard, smooth face, undergoes no shrinkage in volume, and which has low density and high insulation characteristics, while, at the same time, having greater strength or, in other words, a much higher ratio of modulus of rupture to density as compared to blocks of comparable density made by other methods.

The following table is appended to illustrate the strength and density relationship of magnesia blocks molded and cured in accordance with the method of the present invention.

| Molding pressure | Density | Strength (modulus) | Ratio |
|---|---|---|---|
| 13 lbs | 12 | 120 | 10 |
| 13 lbs | 10.6 | 89 | 8.4 |
| 13 lbs | 9.5 | 70 | 7.4 |
| 13 lbs | 8.3 | 50 | 6.0 |
| 13 lbs | 7.5 | 42 | 5.6 |

Magnesia blocks prepared in accordance with the present invention have been found to have a strength modulus-density ratio of at least 4½ throughout a density range of 7½–12 lbs. per cubic foot. Blocks which are molded under pressure in a filter mold and partially cured while retained within the mold do not shrink during the curing operation and may, therefore, be molded and cured to precise dimensions.

Having thus described our invention in rather full detail, it will be understood that these details need not be strictly adhered to, but that various changes and modifications will suggest themselves to one skilled in the art, all falling within the scope of the invention as defined by the subjoined claims.

What we claim is:

1. In manufacturing a magnesia insulation block the steps comprising, forming a slurry mixture of 1½–5% by weight solids content consisting essentially of normal magnesium carbonate, water and asbestos fibers, molding said mixture under 5–18 lbs. gauge pressure with partial dewatering in a filter mold, rapidly heating the molded block while retained within the mold under low external hydrostatic pressure not exceeding 5 lbs. gauge, to an elevated temperature adapted to convert the normal carbonate to basic carbonate to develop a preliminary shape-retaining set, removing the shaped block from the mold, and drying it at an elevated temperature.

2. In manufacturing a magnesia insulation block the steps comprising, forming an aqueous slurry of 1½–5% solids content, by weight, comprising normal magnesium carbonate and asbestos fibers, partially dewatering and shaping the slurry solids to final block form under pressure in a filter mold by retaining solids while removing water from the mold charge over major surface areas thereof, developing a preliminary shape retaining set by maintaining hot water at a temperature above 170° F. in direct contact with the shaped solids block while supporting the same, removing the block from contact with the hot water, and curing the set block while drying it at an elevated temperature.

3. In manufacturing magnesia insulation blocks the steps comprising, introducing an aqueous slurry charge of 1½–5% solids content comprising normal magnesium carbonate and asbestos fibers into a filter mold, partially dewatering and shaping the charge solids under pressure to final block form while completing the charging operation by preventing escape of solids while removing water therefrom over at least about 70% of the surface area of the confined charge, heat curing the wet solids block to develop a preliminary shape retaining set while removing gas therefrom, by maintaining aqueous heating fluid in direct contact with the block while supporting the same, removing the block from contact with the aqueous heating fluid, and finally drying the block at an elevated temperature.

4. In manufacturing a magnesia insulation block to precise dimensions the steps comprising, introducing an aqueous slurry charge of 1½–5% solids content comprising normal magnesium carbonate and asbestos fibers under pressure into a filter mold, partially dewatering and shaping the charge solids while completing the charging operation, retaining the shaped charge within the mold while developing a preliminary shape retaining set by circulating hot water in direct contact with the mold charge, and finally removing the shaped block from the mold and drying it at an elevated temperature.

5. The method of molding a magnesia insulation block to final dimensions and with hard surfaces comprising, introducing a dilute aqueous slurry comprising normal magnesium carbonate and reinforcing fibers into a filter mold, partially dewatering and shaping the charge solids under pressure during the mold charging operation, retaining the shaped charge within the mold while developing a preliminary shape retaining set by direct contact of hot water with the surfaces of the mold and charge, and finally removing the block from the mold and drying it at an elevated temperature.

6. In manufacturing a magnesia insulation block the steps comprising, forming a slurry mixture of 1½–5% solids content, by weight, comprising normal magnesium carbonate, water and asbestos fibers, introducing a charge of said slurry into a filter mold and partially dewatering and shaping the charge solids under pressure while completing the charging operation, heat curing the charge to develop a shape retaining set while confined within the mold by contacting hot water with the mold and mold charge at a temperature within the range of about 170–190° F., and finally removing the block from the mold and drying it at an elevated temperature.

7. The method of molding a magnesia insulation block to substantially final dimensions and form which comprises, introducing a dilute aqueous slurry charge comprising normal magnesium carbonate crystals and asbestos fibers into a filter mold, partially dewatering and shaping the charge solids under pressure while water laying said fibers and crystals with the initially charged fibers oriented generally parallel to the filtering face and with concentration of the crystals and fibers adjacent the dewatering faces of the charge, and with the later charged fibers and crystals more heterogeneously arranged and retaining a greater proportion of water in the interior of the charge, and retaining the shaped charge within the mold while developing a preliminary shape retaining set by contacting an aqueous heating fluid with the external surfaces of the mold and charge at an elevated temperature.

8. The method of molding a magnesia insulation block to substantially final dimensions and with surfaces substantially harder and denser than the interior comprising, introducing a dilute aqueous slurry charge comprising normal magnesium carbonate and asbestos fibers into a filter mold, partially dewatering and shaping the charge solids under pressure while completing the charging operation, retaining the shaped charge within the mold while developing a preliminary shape retaining set by contacting a heating fluid under low hydrostatic pressure not exceeding 5 lbs. gauge with the external surfaces of the mold and charge, removing the block from the mold, and drying it at an elevated temperature.

9. The method of molding magnesia insulation blocks to substantially final dimensions and form which comprises, introducing a dilute aqueous slurry of from 1½–5% solids concentration by weight, containing normal magnesium carbonate and asbestos fibers, under pressure into a filter mold, dewatering and shaping the charge during the charging operation by retaining the solids while removing water therefrom over at least about 70% of the total surface area of the confined charge, heat curing the charge to develop a shape retaining set while confined within the mold by contacting a heating fluid with the external surfaces of the mold and charge, and finally removing the block from the mold and drying it at an elevated temperature.

10. The method of manufacturing a magnesia insulation block which comprises, pressure filter molding a dilute aqueous slurry comprising normal magnesium carbonate and asbestos fibers, partially dewatering and shaping the slurry solids to final block dimensions during the molding operation, developing a preliminary shape retaining set of the wet solids block while supporting the same, by contacting hot water directly therewith, removing the block from contact with the hot water, and drying it at an elevated temperature.

11. In manufacturing a magnesia insulation block the steps comprising, forming a dilute aqueous slurry comprising normal magnesium carbonate and asbestos fibers, preheating the slurry to a temperature above 130° F., partially dewatering and shaping the slurry solids to final block form under pressure by removing water from the wet solids block over major surface areas thereof, developing a shape retaining set of the wet solids block while supporting the same, by directly contacting hot water with the surfaces thereof, removing the blocks from contact with the hot water, and curing the block by drying it at an elevated temperature.

12. A filter molded and cured heat insulation block retaining the mold dimensions and consisting essentially of basic magnesium carbonate and a minor proportion of asbestos fibers integrally bonded together by decomposition of self-setting normal magnesium carbonate in situ, said block having a hard shell which is denser than the core and in which the fibers are oriented longitudinally in a direction generally parallel with the adjacent block face, while the fibers in the core are heterogeneously disposed, and major areas of the hard surfaces of said block bearing imprints of the mold lining, said block having a dry density of 7.5–12 lbs. per cubic ft. and a modulus of rupture/density ratio greater than 4.5 and ranging up to 10 for blocks of 12 lbs. density.

AUGUST M. DINKFELD.
HERMANN F. VIEWEG.